US008549900B2

(12) United States Patent
Nakada

(10) Patent No.: US 8,549,900 B2
(45) Date of Patent: Oct. 8, 2013

(54) GAS STATE ESTIMATION DEVICE FOR INTERNAL COMBUSTION ENGINE

(75) Inventor: Hayato Nakada, Minamitsuru-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/515,660

(22) PCT Filed: Jan. 18, 2010

(86) PCT No.: PCT/JP2010/050860
§ 371 (c)(1),
(2), (4) Date: Jun. 13, 2012

(87) PCT Pub. No.: WO2011/086707
PCT Pub. Date: Jul. 21, 2011

(65) Prior Publication Data

US 2012/0272714 A1 Nov. 1, 2012

(51) Int. Cl.
*G01M 15/00* (2006.01)

(52) U.S. Cl.
USPC .................................... 73/114.32; 73/114.37

(58) Field of Classification Search
USPC ............................ 73/114.32, 114.33, 114.37
See application file for complete search history.

(56) References Cited

U.S. PATENT DOCUMENTS

| | | | | |
|---|---|---|---|---|
| 5,889,205 | A * | 3/1999 | Treinies et al. | 73/114.32 |
| 7,200,486 | B2 * | 4/2007 | Tanaka et al. | 701/109 |
| 7,418,857 | B2 * | 9/2008 | Tanaka | 73/114.34 |
| 7,457,701 | B2 * | 11/2008 | Tanaka | 701/103 |
| 7,549,414 | B2 * | 6/2009 | Moriya | 123/678 |
| 7,775,091 | B2 * | 8/2010 | Ma | 73/114.32 |
| 7,905,135 | B2 * | 3/2011 | Nakano et al. | 73/114.33 |
| 2004/0260482 | A1 | 12/2004 | Tanaka et al. | |

FOREIGN PATENT DOCUMENTS

| | | |
|---|---|---|
| EP | 1 443 199 A1 | 8/2004 |
| JP | A-2004-150376 | 5/2004 |
| JP | A-2007-16683 | 1/2007 |
| JP | B2-4001006 | 10/2007 |
| JP | A-2008-144648 | 6/2008 |
| WO | WO 03/033897 A1 | 4/2003 |

OTHER PUBLICATIONS

International Search Report issued in International Patent Application No. PCT/JP2010/050860 dated Mar. 23, 2010 (with translation).

* cited by examiner

*Primary Examiner* — Freddie Kirkland, III
(74) *Attorney, Agent, or Firm* — Oliff & Berridge, PLC

(57) ABSTRACT

A time-course change (dM/dt) in the mass of air in an intake passage downstream of a throttle value is estimated through application of a mass conservation law to the air in the passage. A time-course change dTm/dt in the temperature of the air in the passage is estimated through application of an energy conservation law to the air in the passage. The pressure of the air in the passage is estimated on the basis of the mass of the air in the passage obtained through integration of dM/dt with respect to time, the intake air temperature obtained through integration of dTm/dt with respect to time, and a state equation applied to the air in the passage. Only the state equation includes a term regarding the volume of the passage. Therefore, it is possible to easily identify the volume while monitoring only a change in the intake air pressure.

5 Claims, 10 Drawing Sheets

GAS STATE ESTIMATION DEVICE FOR INTERNAL COMBUSTION ENGINE

TECHNICAL FIELD

The present invention relates to a gas state estimation device for estimating the state of gas in a gas passage provided in an internal combustion engine. An example of such a gas passage is an intake passage of an internal combustion engine between a throttle valve and an intake valve thereof.

BACKGROUND ART

Conventionally, there has been known a method of estimating the pressure and temperature (hereinafter referred to as "intake air pressure" and "intake air temperature," respectively) of air in an intake passage of an internal combustion engine between a throttle valve and an intake valve thereof (hereinafter referred to as a "post-throttle intake passage") through calculation; specifically, through application of physical laws, such as the mass conservation law, the energy conservation law, and the state equation, to the air in the post-throttle intake passage (see, for example, the pamphlet of WO2003/033897).

Specifically, in the above-mentioned document, a time-course change d(Pm/Tm)/dt in a value (intake air pressure temperature ratio) Pm/Tm obtained by dividing the intake air pressure by the intake air temperature is estimated through use of the following Expression (1), and a time-course change dPm/dt in the intake air pressure Pm is estimated through use of the following Expression (2).

$$d(Pm/Tm)/dt=(R/Vm)\cdot(mt-mc) \tag{1}$$

$$dPm/dt=\kappa\cdot(R/Vm)\cdot(mt\cdot Ta-mc\cdot Tm) \tag{2}$$

In Expressions (1) and (2) given above, Pm represents the intake air pressure; Tm represents the intake air temperature; R represents the gas constant of air; Vm represents the volume of the post-throttle intake passage; mt represents the mass flow rate (mass per unit time) of air flowing into the post-throttle intake passage via the throttle valve; mc represents the mass flow rate (mass per unit time) of air flowing out of the post-throttle intake passage via the intake valve; κ represents the specific-heat ratio of air; Ta represents the temperature of air flowing into the post-throttle intake passage via the throttle valve (atmospheric temperature); and t represents time.

Expression (1) is derived through application of the mass conservation law and the gas state equation to air in the post-throttle intake passage. Expression (2) is derived through application of the energy conservation law and the gas state equation to the air in the post-throttle intake passage. The method of deriving these expressions is described in detail in the above-mentioned document.

The intake air pressure Pm is iteratively estimated by means of iteratively integrating, with respect to time, the value of dPm/dt obtained from Expression (2). Also, the intake air temperature Tm is iteratively calculated on the basis of the iteratively estimated intake air pressure Pm, and the intake air pressure temperature ratio Pm/Tm, which is iteratively estimated by means of iteratively integrating, with respect to time, the value of d(Pm/Tm)/dt obtained from Expression (1). As described above, in the above-mentioned document, the state of air in the post-throttle intake passage (the intake air pressure Pm and the intake air temperature Tm) are iteratively estimated by means of iteratively integrating Expressions (1) and (2) with respect to time.

Incidentally, a volume which has a substantial influence on changes in the intake air pressure Pm and the intake air temperature Tm (hereinafter referred as the "effective volume") is used as the volume Vm of the post-throttle intake passage in Expressions (1) and (2). In general, difficulty is encountered in accurately calculating the effective volume Vm on the basis of only the geometrical shape of the post-throttle intake passage. Accordingly, in order to accurately estimate the intake air pressure Pm and the intake air temperature Tm through use of Expressions (1) and (2), a test (identification experiment) for identifying the effective volume Vm must be carried out.

In this identification experiment, the effective volume Vm is identified, through utilization of a known statistical technique, such that changes in the intake air pressure Pm and the intake air pressure temperature ratio Pm/Tm, which are obtained by iteratively integrating Expressions (1) and (2) with respect to time, approach changes in the actually measured corresponding values, respectively. Both of Expressions (1) and (2) include the term of the effective volume Vm. Therefore, the changes in the intake air pressure Pm and the intake air pressure temperature ratio Pm/Tm may vary depending on the value of the effective volume Vm. That is, it is necessary to identify the effective volume Vm, while monitoring both the changes in the intake air pressure Pm and the intake air pressure temperature ratio Pm/Tm. In addition, since both of Expressions (1) and (2) include a differential term, the degree of change in the intake air pressure Pm and the intake air pressure temperature ratio Pm/Tm in relation to a change in the value of the effective volume Vm is likely to become relatively large. As a result, there has been a problem in that the identification of the effective volume Vm is rather difficult.

DISCLOSURE OF THE INVENTION

The present invention has been accomplished so as to solve the above-described problem, and its object is to provide a gas state estimation device which estimates the state of gas in a gas passage, such as a post-throttle intake passage, provided in an internal combustion engine and which makes it relatively easy to identify the volume (effective volume) of the gas passage required for the estimation.

A gas state estimation device according to the present invention estimates the pressure and temperature of gas in a gas passage provided in an internal combustion engine. The gas passage refers to a predetermined section of a passage through which the gas flows. An example of such a gas passage is an intake passage of the internal combustion engine between a throttle valve and an intake valve thereof (the above-mentioned post-throttle intake passage).

In the present apparatus, a time-course change in the mass of gas in the gas passage is estimated through application of the mass conservation law to the gas in the gas passage. Specifically, the time-course change dM/dt in the mass of the gas in the gas passage is estimated in accordance with Expression (3) given below. In Expression (3), mt represents the mass flow rate of gas flowing into the gas passage; mc represents the mass flow rate of gas flowing out of the gas passage; M represents the mass of gas in the gas passage; and t represent time. The "mass flow rate of gas" refers to the mass of gas flowing into (flowing out of) the gas passage per unit time.

$$dM/dt=mt-mc \tag{3}$$

Also, in the present apparatus, a time-course change in the temperature of gas in the gas passage is estimated through application of the energy conservation law to the gas in the gas passage. Specifically, the time-course change dTm/dt in the temperature of the gas in the gas passage is estimated in accordance with Expression (4) given below. In Expression (4), mt represents the mass flow rate of gas flowing into the gas passage; mc represents the mass flow rate of gas flowing out of the gas passage; M represents the mass of gas in the gas passage; Ta represents the temperature of the gas flowing into the gas passage; Tm represents the temperature of the gas in the gas passage; Cv represents the specific heat at constant volume of the gas in the gas passage; Cp represents the specific heat at constant pressure of the gas in the gas passage; and t represents time.

$$dTm/dt=(1/(M\cdot Cv))\cdot(mt\cdot Cp\cdot Ta-mc\cdot Cp\cdot Tm-dM/dt\cdot Cv\cdot Tm) \quad (4)$$

In addition, in the present apparatus, the mass of the gas is iteratively estimated by means of iteratively integrating the estimated time-course change in the mass of the gas with respect to time. Similarly, the temperature of the gas is iteratively estimated by means of iteratively integrating the estimated time-course change in the temperature of the gas with respect to time. Then, the pressure of the gas in the gas passage is estimated on the basis of the gas state equation which is applied to the gas in the gas passage and which includes a term regarding the volume of the gas passage. Specifically, the pressure Pm of the gas in the gas passage is estimated in accordance with Equation (5) given below. In Expression (5), M represents the mass of the gas obtained by iteratively integrating, with respect to time, the time-course change in the mass of the gas in the gas passage; Tm represents the temperature of the gas obtained by iteratively integrating, with respect to time, the time-course change in the temperature of the gas in the gas passage; R represents the gas constant of the gas in the gas passage; Vm represents the volume of the gas passage; and Pm represents the pressure of the gas in the gas passage.

$$Pm=(1/Vm)\cdot M\cdot R\cdot Tm \quad (5)$$

As described above, in the gas state estimation device of the present invention, the pressure and temperature of gas within the gas passage are estimated through utilization of Expressions (3), (4), and (5) given above. Of Expressions (3), (4), and (5), only Expression (5) includes a term regarding the volume (effective volume) Vm of the gas passage. Accordingly, of the time-course change dM/dt in the mass of the gas, the time-course change dTm/dt in the temperature of the gas, and the gas pressure Pm, only the gas pressure Pm may change depending on the value of the effective volume Vm. That is, the effective volume Vm can be identified through monitoring of only a change in the gas pressure Pm. In addition, since Expression (5) does not include a differential term, the degree of change in the gas pressure Pm in relation to change in the value of the effective volume Vm is small, as compared with the case where the expression includes a differential term. Therefore, the gas state estimation device of the present invention can make it relatively easy to identify the volume (effective volume) of the gas passage.

BEST MODE FOR CARRYING OUT THE INVENTION

Figure 1:
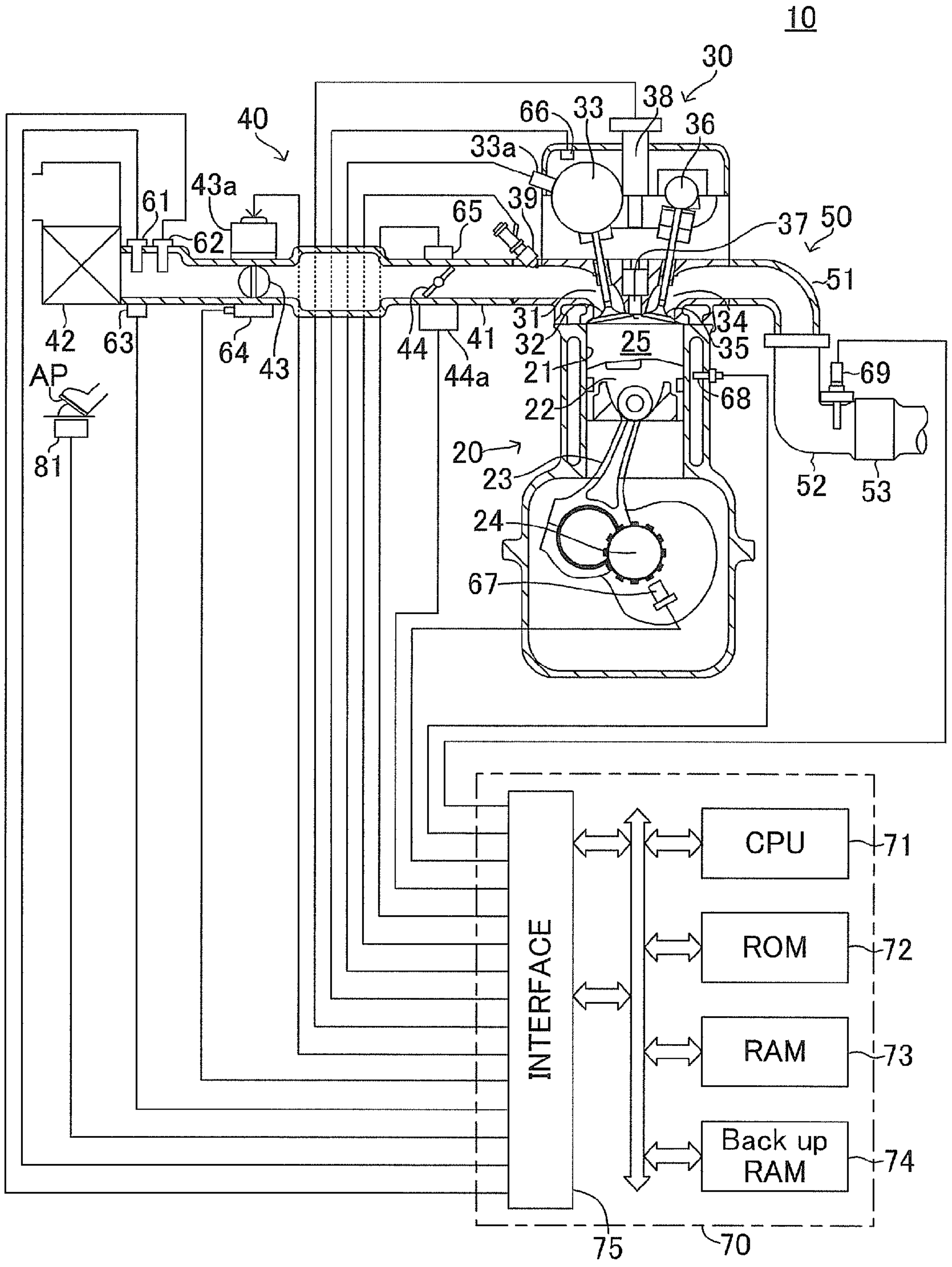
FIG. 1 is a schematic diagram of a system in which a fuel injection quantity control apparatus including a gas state estimation device of the present invention is applied to a spark-ignition-type multi-cylinder internal combustion engine.

An embodiment of a gas state estimation device for an internal combustion engine according to the present invention will now be described with reference to the drawings. FIG. 1 schematically shows the configuration of a system configured such that a fuel injection quantity control apparatus including the embodiment of the gas state estimation device for an internal combustion engine according to the present invention is applied to a spark-ignition multi-cylinder (4-cylinder) internal combustion engine 10.

This internal combustion engine 10 includes a cylinder block section 20 including a cylinder block, a cylinder block lower case, an oil pan, etc.; a cylinder head section 30 fixed onto the cylinder block section 20; an intake system 40 for supplying gasoline mixture to the cylinder block section 20; and an exhaust system 50 for discharging exhaust gas from the cylinder block section 20 to the outside of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The cylinder 21 and the head of the piston 22 form a combustion chamber 25 in cooperation with the cylinder head section 30.

The cylinder head section 30 includes intake ports 31 communicating with the corresponding combustion chambers 25; intake valves 32 for opening and closing the corresponding intake ports 31; a variable intake timing apparatus 33 which includes an intake cam shaft for driving the intake valves 32 and continuously changes the phase angle of the intake cam shaft; an actuator 33*a* for the variable intake timing apparatus 33; exhaust ports 34 communicating with the corresponding combustion chambers 25; exhaust valves 35 for opening and closing the corresponding exhaust ports 34; an exhaust cam shaft 36 for driving the exhaust valve 35; spark plugs 37; an igniter 38 including an ignition coil for generating a high voltage to be applied to the spark plugs 37; and injectors (fuel injection means) 39 for injecting fuel into the corresponding intake ports 31.

The intake system 40 includes an intake pipe 41 which formed of resin and which includes an intake manifold communicating with the intake ports 31 and forms an intake passage in cooperation with the intake ports 31; an air filter 42 provided at an end portion of the intake pipe 41; a throttle valve 43 provided within the intake pipe 41 in order to change the opening cross-sectional area of the intake passage; a throttle valve actuator 43*a* constituting a throttle valve drive means; a swirl control valve (hereinafter referred to as an "SCV") 44; and an SCV actuator 44*a*. Notably, the space inside the intake pipe 41 which is downstream of the throttle valve 43 and is upstream of the intake valves 32 is called a "post-throttle intake passage."

The throttle valve actuator 43*a* composed of a DC motor drives the throttle valve 43 such that the actual throttle valve opening TA coincides with a target throttle valve opening TAt which is given by an electronically-controlled throttle valve logic realized by an electronic control apparatus 70, which will be described later.

An exhaust system 50 includes an exhaust manifold 51 communicating with the exhaust ports 34; an exhaust pipe 52 connected to the exhaust manifold 51; and a catalytic converter (three-way catalytic apparatus) 53 which is inserted in the exhaust pipe 52 and has a so-called oxygen storage/release function. Notably, the exhaust ports 34, the exhaust manifold 51, and the exhaust pipe 52 form an exhaust passage.

Meanwhile, this system includes a hot-wire air flowmeter 61; an intake air temperature sensor 62; an atmospheric pressure sensor (pre-throttle pressure sensor) 63; a throttle position sensor 64; an SCV opening sensor 65; a cam position sensor 66; a crank position sensor 67; a water temperature sensor 68; an air-fuel ratio sensor 69; and an accelerator opening sensor 81.

The air flowmeter 61 measures the mass flow rate of the intake air flowing through the intake pipe 41, and outputs a voltage Vg representing the measured mass flow rate. The atmospheric temperature sensor 62 disposed in the air flowmeter 61 detects the temperature of the intake air (atmospheric temperature), and output a signal representing the measured atmospheric temperature THA. The atmospheric pressure sensor 63 (outside pressure obtainment means) detects the pressure (i.e., atmospheric pressure) on the upstream side of the throttle valve 43, and outputs a signal representing the detected atmospheric pressure Pa.

The throttle position sensor 64 detects the opening of the throttle valve 43, and outputs a signal representing the detected throttle valve opening TA. The SVC opening sensor 65 detects the opening of the SCV 44, and outputs a signal representing the detected SCV opening θiv. The camp position sensor 66 outputs a signal (G2 signal) that presents one pulse each time the intake cam shaft rotates 90° (i.e., each time the crank shaft 24 rotates 180°). The crank position sensor 67 outputs a signal that presents a narrow pulse each time the crank shaft 24 rotates 10°, and presents a wide pulse each time the crank shaft 24 rotates 360°. This signal represents the rotational speed NE of the engine.

The water temperature sensor 68 detects the temperature of cooling water for the internal combustion engine 10, and outputs a signal representing the detected cooling water temperature THW. The air-fuel ratio sensor 69 detects the oxygen concentration of the exhaust gas flowing into the catalytic converter 53, and outputs a signal representing the air-fuel ratio corresponding to the detected oxygen concentration. The accelerator opening sensor 81 detects the operation amount of an accelerator pedal AP operated by a driver, and outputs a signal representing the detected operation amount Accp of the accelerator pedal.

The electric control apparatus 70 is a microcomputer, which includes the following mutually bus-connected elements: a CPU 71; a ROM 72 in which a program to be executed by the CPU 71, tables (lookup tables and maps), constants, etc. are stored in advance; a RAM 73 in which the CPU 71 temporarily stores data as required; a backup RAM 74 which stores data while it is powered and retains the stored data while it is not powered; and an interface 75 including an AD converter. The interface 75 is connected to the above-described sensors 61 to 69 and 81 so as to send signals from these sensors to the CPU 71. In addition, in accordance with instructions from the CPU 71, the interface 75 sends drive signals to the actuator 33*a* for the variable intake taming control apparatus 33, the igniter 38, the injectors 39, the throttle valve actuator 43*a*, and the SCV actuator 44*a*.

Next, there will be described a method for determining a fuel injection quantity through use of a physical model implemented by the fuel injection quantity apparatus (hereinafter sometimes referred to as "the present apparatus") which includes the state quantity estimation device configured as mentioned above. The processing described hereinafter is executed through execution of a program by the CPU 71.

(Outline of Method for Determining the Fuel Injection Quantity Fi)

The above-described fuel injection quantity control apparatus must inject a predetermined quantity of fuel at a point in time before the point in time (at the intake valve closing timing) at which the intake valve 32 of a certain cylinder (i.e., a fuel injection cylinder)—which is in the intake stroke or in a state immediately before the intake stroke—changes its state from an open state to a closed state (at the intake valve closing timing) in the intake stroke. For this purpose, the present fuel injection quantity control apparatus predicts in advance the quantity (in-cylinder intake air quantity) of air which will have been taken into the cylinder before the intake valve 32 closes, and injects fuel into the cylinder in a quantity corresponding to the predicted in-cylinder intake air quantity before the intake valve 32 closes. In the present embodiment, the timing at which fuel injection ends is set to a crank angle of 75° before intake top dead center (hereinafter referred to as "BTDC75° CA," and other crank angles will also be represented in the same manner) of the fuel injection cylinder. Accordingly, the present device predicts the in-cylinder intake air quantity of the fuel injection cylinder at a point in time before a point corresponding to BTDC75° CA in consideration of the time required for injection (the time required for the injector valve to open) and the time required for the CPU 71 to perform computation.

Meanwhile, the air pressure (i.e., intake air pressure) in the post-throttle intake passage at the intake valve closing timing is closely related to the in-cylinder intake air quantity. In addition, the intake air pressure at the time intake valve closing depends on the throttle valve opening at the intake valve closing timing. Hence, the present apparatus predicts (estimates) the throttle valve opening at the intake valve closing timing; predicts in advance the intake air quantity KLfwd(k) of the fuel injection cylinder on the basis of the throttle valve opening; and obtains the fuel injection quantity fi(k) through use of Expression (6) given below; that is, by dividing the predicted intake air quantity KLfwd(k) by a target air-fuel ratio AbyFref which is separately determined in accordance with the engine operation state. Notably, the suffix k represents that the value is computed at the present computation timing (the same is true of other variables, etc.). The method for obtaining the fuel injection quantity fi has been briefly described above.

$$fi(k)=KLfwd(k)/AbyFref \quad (6)$$

(Specific Configuration and Action)

Hereinafter, there will be described the specific configuration and action of the present apparatus for obtaining the above-described fuel injection quantity fi. As shown in the functional block diagram of FIG. 2, the fuel injection quantity control apparatus including the state quantity estimation device includes the accelerator opening sensor 81 for detecting the actual accelerator pedal operation amount Accp at the present point in time; an electronically-controlled throttle valve logic A1; an electronically-controlled throttle valve model M1; an intake air model A2 including an air model which models the behavior of air in the intake system of the internal combustion engine; a target air-fuel ratio setting means A3; and an injection quantity determination means A4. Hereinafter, these means, models, etc. will be described individually.

(Electronically-Controlled Throttle Valve Logic and Electrically-Controlled Throttle Valve Model)

First, there will be described the electronically-controlled throttle valve logic A1 for controlling the throttle valve opening and the electronically-controlled throttle valve model M1 for predicting a throttle valve opening TAest in the future (at a point in time later than the present point in time).

Figure 3:
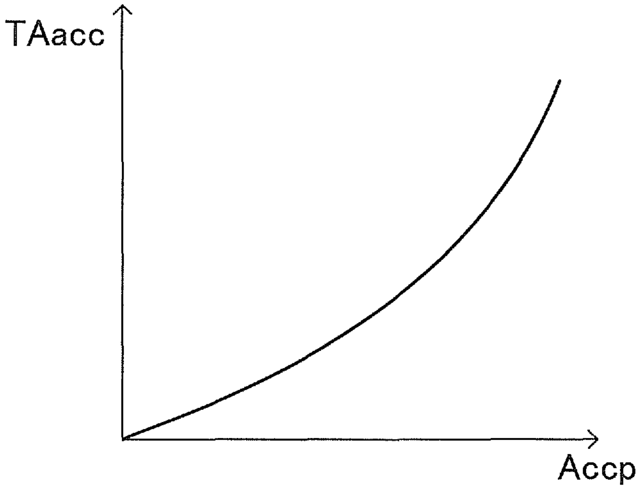
FIG. 3 is a graph showing a table which defines the relation between accelerator pedal operation amount and provisional target throttle valve opening and to which the CPU shown in FIG. 1 refers.
Figure 4:
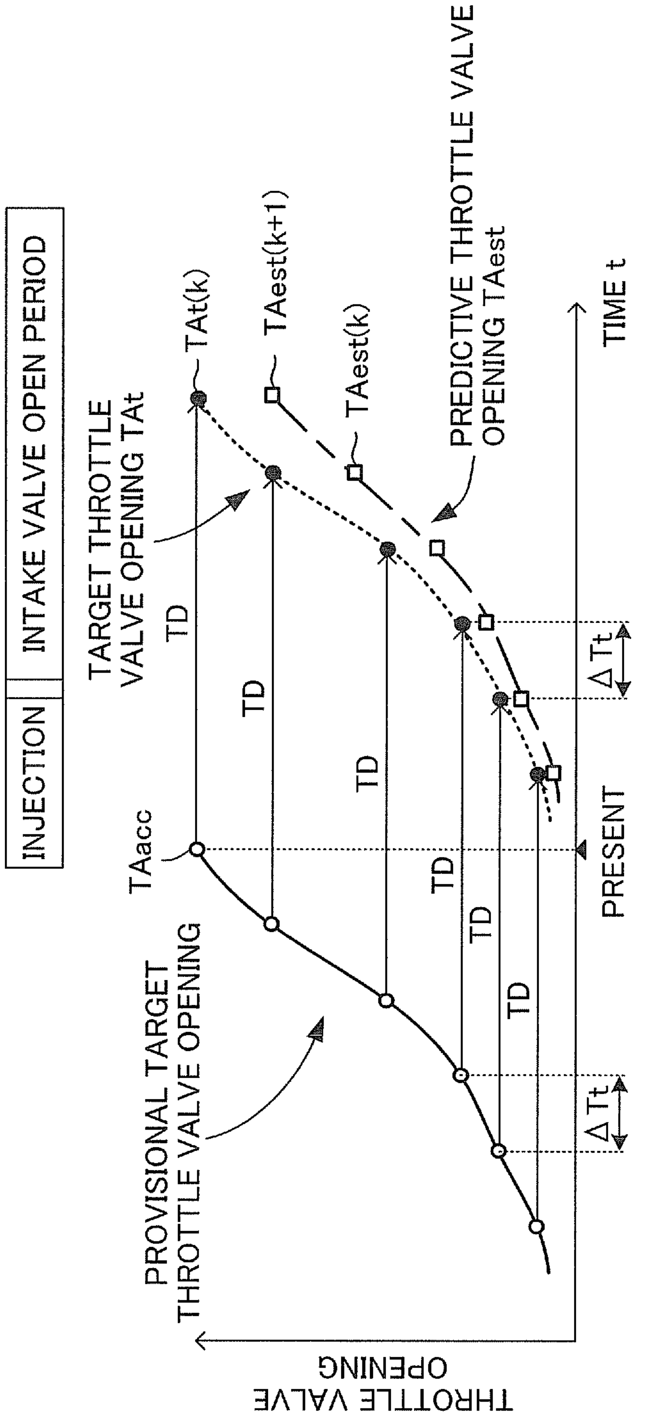
FIG. 4 is a time chart showing changes in provisional target throttle valve opening, target throttle valve opening, and predictive throttle valve opening.

The electronically-controlled throttle valve logic A1 first reads the accelerator pedal operation amount Accp on the basis of the output value from the accelerator opening sensor 81 each time a computation period ΔTt (e.g., 8 msec) lapses; obtains a provisional target throttle valve opening TAacc on the basis of the read accelerator pedal operation amount Accp and the table shown in FIG. 3 which defines the relation between the accelerator pedal operation amount Accp and the target throttle valve opening TAacc; delays the application of the obtained provisional target throttle valve opening TAacc by a predetermined delay time TD as shown in the timing chart of FIG. 4; and outputs, as a target throttle valve opening TAt, the provisional target throttle valve opening TAacc to the throttle valve actuator 43*a*. Notably, in the present embodiment, the delay time TD is fixed. However, the delay time TD may vary with the engine rotational speed NE; for example, may be set to a time T270 which is required for the internal combustion engine to rotate by a predetermined crank angle (e.g., 270° CA).

Incidentally, even if the target throttle valve opening TAt is output from the electronically-controlled throttle valve logic A1 to the throttle valve actuator 43*a* properly, it takes a certain time for the actual throttle valve opening TA to become the same as the target throttle valve opening TAt due to the delay in operation of the throttle valve actuator 43*a*, inertia of the throttle valve 43, etc. To solve this problem, the electronically-controlled throttle valve model M1 predicts (estimates) the throttle valve opening after lapse of the delay time TD on the basis of Expression (7) given below (see FIG. 4).

$$TAest(k+1)=TAest(k)+\Delta Tt\cdot f(TAt(k),\ TAest(k)) \quad (7)$$

Figure 5:
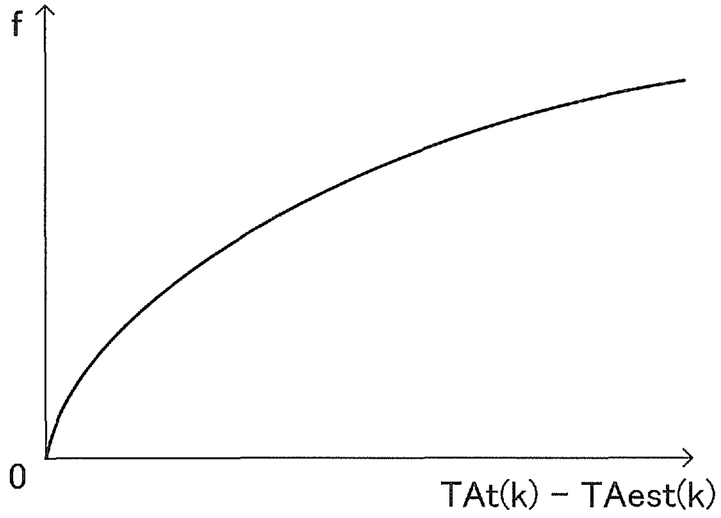
FIG. 5 is a graph showing a function used for calculation of the predictive throttle valve opening.

In Expression (7) given above, TAest(k+1) is the predictive throttle valve opening TAest to be newly predicted (estimated) at the present computation timing; TAt(k) is the target throttle valve opening TAt that has been newly obtained at the present computation timing; and TAest(k) is the latest predictive throttle valve opening TAest that has been predicted (estimated) before the present computation timing (i.e., the throttle valve opening TAest which was predicted (estimated) at the previous computation timing). Notably, the function f(TAt(k), TAest(k)) is a function whose value increases with the difference ΔTA (=TAt(k)−TAest(k)) between TAt(k) and TAest(k) as shown in FIG. 5 (in other words, the function f is a function that increases monotonically in relation to ΔTA).

As described above, at the present computation timing, the electronically-controlled throttle valve model M1 (CPU 71) newly determines the target throttle valve opening TAt after lapse of the delay time TD; newly predicts (estimates) the throttle valve opening TAest after lapse of the delay time TD; and memorizes (stores) in the RAM 73 the values of target throttle valve opening TAt and predictive throttle valve opening TAest between the present point in time and the point in time after lapse of the delay time TD such that these values are related to the time that elapses from the present point in time.

(Intake Air Model A2)

The intake air model A2 includes a throttle model M2 constituting an air model which models the behavior of air in the intake system of the internal combustion engine; an intake valve model M3; an intake pipe model M4; and an intake valve model M5. The intake air model A2 predicts (estimates), on the basis of at least the predictive throttle valve opening TAest predicted (estimated) by the electrically-controlled throttle valve model M1, the in-cylinder intake air quantity (predicted intake air quantity KLfwd(k)) at the intake valve closing timing in the current intake stroke of the fuel injection cylinder. The above-described throttle model M2, the intake valve model M3, the intake pipe model M4, and the intake valve model M5 will be described in detail later.

Notably, in the present embodiment, the throttle model M2, the intake valve model M3, the intake pipe model M4, and the intake valve model M5 are used to predict (estimate) the predicted intake air quantity KLfwd(k) at the intake valve closing timing. However, the intake air model A2 may be configured such that the predicted intake air quantity KLfwd (k) at the intake valve closing timing in the current intake stroke is obtained (predicted) using the predictive throttle valve opening TAest at the intake valve closing timing in the current intake stroke of the fuel injection cylinder, the actual engine rotational speed NE at the intake valve closing timing in the current intake stroke of the fuel injection cylinder, and a table (defining the relation between the throttle valve opening TA and the engine rotational speed NE; and in-cylinder intake air quantity).

(Target Air-Fuel Ratio Setting Means A3)

The target air-fuel ratio setting means A3 determines the target air-fuel ratio AbyFref on the basis of the engine rotational speed NE, which represents the operation state of the internal combustion engine, the target throttle valve opening TAt, etc. For example, after completion of warm-up of the internal combustion engine, the target air-fuel ratio AbyFref may be set to a stoichiometric air-fuel ratio, except in special cases.

(Injection Quantity Determination Means A4)

Figure 2:
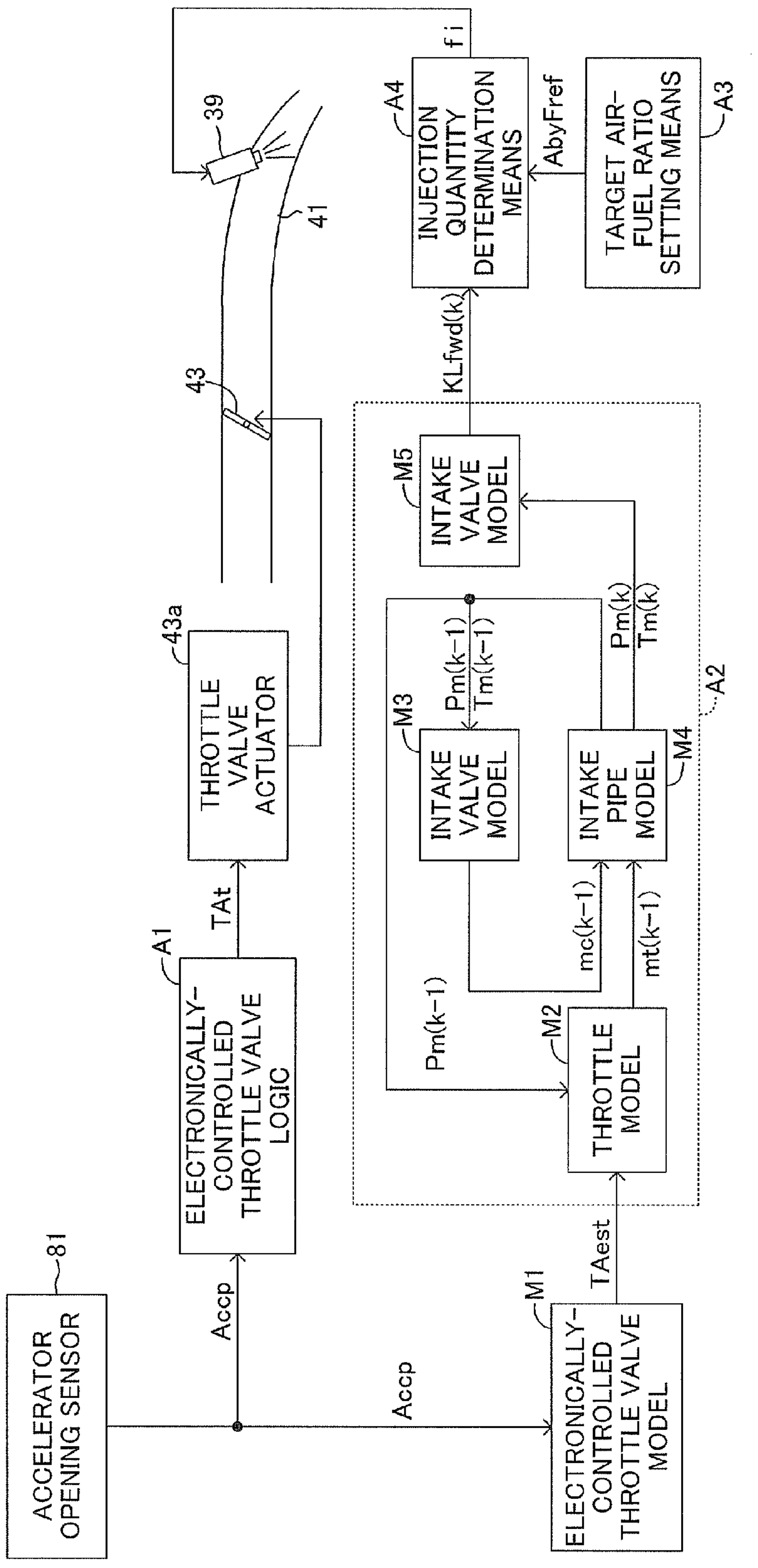
FIG. 2 is a functional block diagram of various logics and various models for controlling throttle valve opening, and for determining intake air pressure, intake air temperature, predictive intake air quantity, and fuel injection quantity.

The injection determination means A4 shown in FIG. 2 determines the fuel injection quantity fi(k) in the current stroke of a specific cylinder in accordance with Expression (6) given above; that is, on the basis of the predictive intake air quantity KLfwd(k) at the intake valve closing timing in the current intake stroke of the specific cylinder which has been computed by the intake air model A2 and the target air-fuel ratio AbyFref which has been determined by the target air-fuel ratio setting means A3.

Next, the above-described intake air model A2 will be described in detail. As shown in FIG. 2, the intake air model A2 includes the models M2 to M5. Hereinafter, these models M2 to M5 included in the intake air model A2 will be described one after another.

(Throttle Model M2)

The throttle model M2 estimates the flow rate mt of air that has passed through the throttle valve 43 (the throttle valve passing air flow rate) on the basis of Expressions (8) and (9) given below, which are derived from physical laws such as the energy conservation law, the momentum conservation law, the mass conservation law, and the state equation. In Expressions (8) and (9) given below, Ct(θt) is a flow rate coefficient that varies with the throttle valve opening θt (=TA); At(θt) is the throttle opening area (opening area of the intake pipe 41) that varies with the throttle valve opening θt (=TA); ν is the flow rate of air passing through the throttle valve 43; ρm is the atmospheric density, Pa is the air pressure (i.e., atmospheric pressure) on the upstream side of the throttle valve; Pm is the air pressure (i.e., intake air pressure) in the post-throttle intake passage; Ta (=THA)is the air temperature (i.e., atmospheric temperature) on the upstream side of the throttle valve; R is the gas constant; κ is the specific heat ratio. Notably, in the present embodiment, air is handled as a diatomic molecule composed of two atoms; namely, an oxygen atom and an nitrogen atom, whereby the specific heat ratio κ is assumed to be 1.4 (fixed value).

$$mt = Ct(\theta t)\cdot At(\theta t)\cdot v\cdot \rho m = Ct(\theta t)\cdot At(\theta t)\cdot \{Pa/(R\cdot Ta)^{1/2}\}\cdot \Phi(Pm/Pa) \quad (8)$$

$$\Phi(Pm/Pa) = \begin{cases} \sqrt{\dfrac{\kappa}{2\cdot(\kappa+1)}} \\ \sqrt{\left\{\dfrac{\kappa-1}{2\cdot\kappa}\cdot\left(1-\dfrac{Pm}{Pa}\right)+\dfrac{Pm}{Pa}\right\}\cdot\left(1-\dfrac{Pm}{Pa}\right)} \end{cases} \quad (9)$$

In Expression (9) given above, the value of (1/(κ+1)) ≈0.4167 corresponds to the case where the intake air pressure Pm is equal to the critical pressure in hydrodynamics. As can be understood from Expression (9) given above, when the intake air pressure Pm is greater than the above-described critical pressure (i.e., the value of (Pm/Pa)>0.4167), the value of Φ(Pm/Pa) (hence, the throttle valve passing air flow rate mt) decreases as the intake air pressure Pm increases. Meanwhile, when the intake air pressure Pm is equal to or less than the above-described critical pressure (i.e., the value of (Pm/Pa)≤0.4167), the value of Φ(Pm/Pa) (hence, the throttle valve passing air flow rate mt) is fixed or constant irrespective of the intake air pressure Pm.

Next, there will be described the method for obtaining the throttle valve passing air flow rate mt in the throttle model M2. By replacing Ct(θt)·At(θt)·{Pa/(R·Ta)$^{1/2}$} in Expression (8) given above with k1, Expression (8) given above can be rewritten to Expression (10) given below, where mts represents the throttle valve passing air flow rate at the intake valve closing timing.

$$mts = k1\cdot\Phi(Pm/Pa) \quad (10)$$

Also, when the intake air pressure PmTA in the case where the internal combustion engine 10 is in the steady state (the throttle valve opening is held constant until the intake valve closes) is applied to Expression (10) given above, there can be obtained Expression (11) given below, which represents the throttle valve passing air flow rate mtsTA in that case. Expression (12) given below can be obtained from Expression (10) given above and Expression (11) given below through elimination of k1 therefrom.

$$mtsTA = k1\cdot\Phi(PmTA/Pa) \quad (11)$$

$$mts = \{mtsTA/\Phi(PmTA/Pa)\}\cdot\Phi(Pm/Pa) \quad (12)$$

In Expression (12) given above, the value of mtsTA on the right-hand side represents the intake air flow rate (throttle valve passing air flow rate) in the steady operation state where the throttle valve opening TA is constant. In such a steady operation state, the throttle valve passing air flow rate mt becomes equal to the intake valve passing air flow rate mc. Hence, the throttle model M2 obtains the intake valve passing air flow rate mc at a point in time which precedes the present point in time by the computation period ΔTt, through use of an expression (Expression (13) given below) derived from an empirical law, which is used by the intake valve model M3 (which will be described later). The throttle model M2 uses the obtained value mc as the value mtsTA. Notably, both of the parameters (the engine rotational speed NE and the intake valve open-close timing VT) used to obtain the value of mtsTA are the actual values at a point in time which precedes the present point in time by the computation period ΔTt.

Meanwhile, the throttle model M2 obtains the time from the moment immediately before the start of fuel injection (BTDC90° CA) to the intake valve closing timing on the basis of the engine rotational speed NE, and reads, from the RAM 72, a predictive throttle valve opening TAest after lapse of a delay time which is approximately equal to the obtained time. The throttle model M2 uses the read predictive throttle valve opening TAest as a predictive throttle valve opening TAest (k−1). In addition, the throttle model M2 stores, in the ROM 72, a table MAPPM which defines the relation between the intake air pressure Pm; and the throttle valve opening TA, the predictive intake air quantity KLfwd, the engine rotational speed NE, and the intake valve open-close timing VT. The throttle model M2 obtains the intake air pressure PmTA (=MAPPM(TAest(k−1), KLfwd(k−1), NE, VT) on the right-hand side of Expression (7) given above on the basis of the above-described predictive throttle valve opening TAest(k−1), the previous (predictive) intake air quantity KLfwd(k−1) which has already been obtained by the intake valve model M5 (which will be described later), the actual engine rotational speed NE at a point in time which precedes the present point in time by the computation period ΔTt, the actual intake valve open-close timing VT at a point in time which precedes the present point in time by the computation period ΔTt, and the above-described table MAPPM.

In addition, the throttle model M2 stores a table MAPΦ which defines the relation between the value of Pm/Pa and the value of Φ(Pm/Pa). The throttle model M2 obtains the value of Φ(PmTA/Pa)(=MAPΦ(PmTA/Pa)) on the right-hand side of Expression (12) given above from the value of (PmTa/Pa), which is obtained by dividing the above-described intake air pressure PmTA by the pre-throttle pressure Pa, and the above-described table MAPΦ. In the same manner, the throttle model M2 obtains the value of Φ(Pm/Pa)(=MAPΦ(Pm(k−1)/Pa)) on the right-hand side of Expression (12) given above from the value of (Pm(k−1)/Pa), which is obtained by dividing the previous intake air pressure Pm(k−1) obtained already by the intake pipe model M4, which will be described later, by the pre-throttle pressure Pa, and the above-described table MAPΦ. Since the factors on the right-hand side of Expression (12) given above can be obtained as mentioned above, the predictive throttle valve passing air flow rate mts (=mt(k−1)) can be obtained by multiplying these factors together. As mentioned above, the means for obtaining the predictive throttle valve passing air flow rate mts(=mt(k−1)) corresponds to the throttle valve passing air flow rate obtaining means.

(Intake Valve Model M3)

The intake valve model M3 estimates the intake valve passing air flow rate mc from the intake air pressure Pm, intake air temperature (air temperature in the post-throttle intake passage) Tm, the atmospheric temperature THA (=Ta), etc. Since the pressure within the cylinder at the intake valve closing timing can be considered to be equal to the pressure on the upstream side of the intake valve 32 at the intake valve closing timing; i.e., the intake air pressure Pm at the intake valve closing timing, the intake valve passing air flow rate mc is proportional to the intake air pressure Pm at the intake valve closing timing. Therefore, the intake valve model M3 obtains the intake valve passing air flow rate mc in accordance with Expression (13) given below, which is derived from an empirical law.

$$mc=(THA/Tm)\cdot(c\cdot Pm-d) \quad (13)$$

In Expression (13) given above, c is a proportionality coefficient and d represents the quantity of the burnt gas remaining in the cylinder. The intake valve model M3 stores tables MAPC and MAPD in the ROM 72. The table MAPC defines the relation between the engine rotational speed NE and the intake valve open-close timing VT; and the proportionality coefficient c. The table MAPD defines the relation between the engine rotational speed NE and the intake valve open-close timing VT; and the burnt gas quantity d. The intake value mode M3 obtains the proportionality coefficient c (=MAPC(NE, VT)) and the burnt gas quantity d((=MAPD (NE, VT)) respectively from the actual engine rotational speed NE at the present point in time, the actual intake valve open-close timing VT at the present point in time, and the above-described tables stored therein. In addition, when performing computation, the intake valve model M3 estimates the intake valve passing air flow rate mc (=mc(k−1)) by substituting the latest intake air pressure Pm (=Pm(k−1)), which has already been estimated by the intake pipe model M4 (which will be described later), and the latest intake air temperature Tm (=Tm(k−1)) into Expression (13) given above. The means for obtaining the intake valve passing air flow rate mc (=mc(k−1)) as mentioned above corresponds to the intake valve passing air flow rate obtaining means.

(Intake Pipe Model M4)

The intake pipe model M4 obtains the intake air pressure Pm and the intake air temperature Tm in the post-throttle intake passage on the basis of Expressions (14), (15), and (16) (given below) which are derived from the mass conservation law, the energy conservation law, and the gas state equation respectively, the throttle valve passing air flow rate mt, and the intake valve passing air flow rate mc, which represents the flow rate of air flowing out of the intake pipe 41. Notably, Expressions (14), (15), and (16) given below are the same as the above-described Expressions (3), (4), and (5), respectively.

$$dM/dt=mt-mc \quad (14)$$

$$dTm/dt=(1/(M\cdot Cv))\cdot(mt\cdot Cp\cdot Ta-mc\cdot Cp\cdot Tm-dM/dt\cdot Cv\cdot Tm) \quad (15)$$

$$Pm=(1/Vm)\cdot M\cdot R\cdot Tm \quad (16)$$

In Expression (16) given above, Vm represents the volume of the post-throttle intake passage. More properly, Vm represents the volume (effective volume) of the post-throttle intake passage which has a substantial influence on changes in the intake air pressure Pm and the intake air temperature Tm (Vm is fixed or constant in the present embodiment). As mentioned above, the volume Vm (fixed) is determined through identification experiment. M represents the mass of air in the post-throttle intake passage. Ta represents the temperature (i.e., atmospheric temperature) of air passing through the throttle valve. In the present embodiment, the atmospheric temperature Ta is obtained from the result of detection by the atmospheric temperature sensor 62. Cv, Cp, and R represent the specific heat at constant volume of air, the specific heat at constant pressure of air, and the gas constant of air, respectively (these values are fixed or constant in the present embodiment).

The intake pipe model M4 receives the throttle valve passing air flow rate mt (=mt(k−1)), which is on the right-hand sides of Expressions (14) and (15), from the throttle model M2, and receives the intake valve passing air flow rate mc (=mc(k−1)) from the intake valve model M3. The intake pipe model M4 iteratively estimates the latest air mass M (=M(k)) by iteratively integrating Expression (14) with respect to time. Also, the intake pipe model M4 iteratively estimates the latest intake air temperature Tm (=Tm(k)) by iteratively integrating Expression (15) with respect to time. Next, the intake pipe model M4 iteratively substitutes the obtained integral values M and Tm into Expression (16) given above so as to estimate the latest intake air pressures Pm (=Pm(k)) iteratively.

Here, there will be described how Expressions (14) and (15) used by the above-described intake pipe model M4 are derived. First, how Expression (14) is derived will be described. If the mass conservation law is applied to the air in the post-throttle intake passage, the time-course change dM/dt in the mass M of the air in the post-throttle intake passage can be considered to be the difference between the throttle valve passing air flow rate mt, which corresponds to the quantity of the air flowing into the post-throttle intake passage, and the intake valve passing air flow rate mc, which corresponds to the quantity of the air flowing out from the post-throttle intake passage. Accordingly, Expression (14) given above can be derived.

Next, how Expression (15) is derived will be developed. There will be discussed the energy conservation law relating the air in the post-throttle intake passage. The volume Vm (effective volume) of the post-throttle intake passage is assumed to be invariable. In addition, most of the energy in the post-throttle intake passage is assumed to contribute to temperature increase (kinetic energy is negligible).

Then the time-course change in the internal energy M·Cv·Tm of the air in the post-throttle intake passage can be considered to be equal to the difference between the energy Cp·mt·Ta of the air flowing into the post-throttle intake passage and the energy Cp·mc·Tm of the air flowing out from the post-throttle intake passage. Accordingly, Expression (17) given below can be obtained. Through arrangement of Expression (17) in terms of dTm/dt, Expression (15) given above can be obtained.

$$d(M\cdot Cv\cdot Tm)/dt=M\cdot Cv\cdot dTm/dt+Cv\cdot Tm\cdot dM/dt=Cp\cdot mt\cdot Ta-Cp\cdot mc\cdot Tm \quad (17)$$

(Intake Valve Model M5)

The intake valve model M5 includes a model which is similar to the above-described intake valve model M3. The intake valve model M5 obtains the latest intake valve passing air flow rate mc (=mc(k)) through use of the latest intake air pressure Pm (=Pm(k)) and the intake air temperature Tm (=Tm(k)), which are computed by the intake pipe model M4; the engine rotational speed NE at the present point in time; the intake valve open-close timing VT at the present point in time; the above-described map MAPC; the above-described map MAPD; and Expression (13) (mc=(THA/Tm)·(c·Pm−d)) derived from the above-mentioned empirical law. Next, the intake valve model M5 obtains the predictive intake air quantity KLfwd(k) by multiplying the obtained intake valve passing air flow rate mc(k) by the time required for performing the intake stroke (time that elapses from the moment the intake valve 32 opens to the moment it closes) Tint which is computed on the basis of the engine rotational speed NE. The intake valve model M5 performs such computation for each cylinder each time a predetermined time elapses.

As mentioned above, the intake air model A2 updates the predictive intake air quantity KLfwd(k) each time a predetermined time elapses. At that time, since the predictive intake air quantity KLfwd(k) is computed on the basis of the predictive throttle valve opening TAest(k−1) after lapse of a delay time which is approximately equal to the time between the moment immediately before the start of fuel injection (BTDC90° CA) and the intake valve closing timing, and the fuel injection quantity fi(k) is computed on the basis of the predictive intake air quantity KLfwd(k) at the point in time immediately before start of fuel injection (see Expression (1) given above). Therefore, the intake air model A2 substantially predicts the in-cylinder intake air quantity (predictive intake air quantity KLfwd(k)) on the basis of the predictive throttle valve opening TAest(k−1) at the intake valve closing timing in the intake stroke of a certain cylinder.

That is, at a predetermined point in time before the intake valve closing timing in the current intake stroke of a specific cylinder (in the present embodiment, at a predetermined timing (specifically, BTDC90° CA) before the start of fuel injection (BTDC75° CA) in the current intake stroke of said cylinder, the intake air model A2 computes the predictive intake air quantity KLfwd(k), which is the in-cylinder intake air quantity at the intake valve closing timing in the current intake stroke of said cylinder, on the basis of the models M2 to M5, and the predictive throttle valve opening TAest(k−1) at a point in time in the vicinity of the intake valve closing timing in the current intake stroke, which is predicted by the electrically-controlled throttle valve model M1.

As mentioned above, the intake air pressure Pm, the intake air temperature Tm, and the predictive intake air quantity KLfwd(k), which are state quantities relating to the intake air of the internal combustion engine 10, are estimated by the models and means shown in FIG. 2, and the fuel injection quantity fi is computed on the basis of the predictive intake air quantity KLfwd(k).

Next, the actual operation of the electric control apparatus 70 will be described with reference to the flowcharts shown in FIG. 6 to FIG. 10.

(Computation of Target Throttle Valve Opening and Estimative Throttle Valve Opening)

Figure 6:
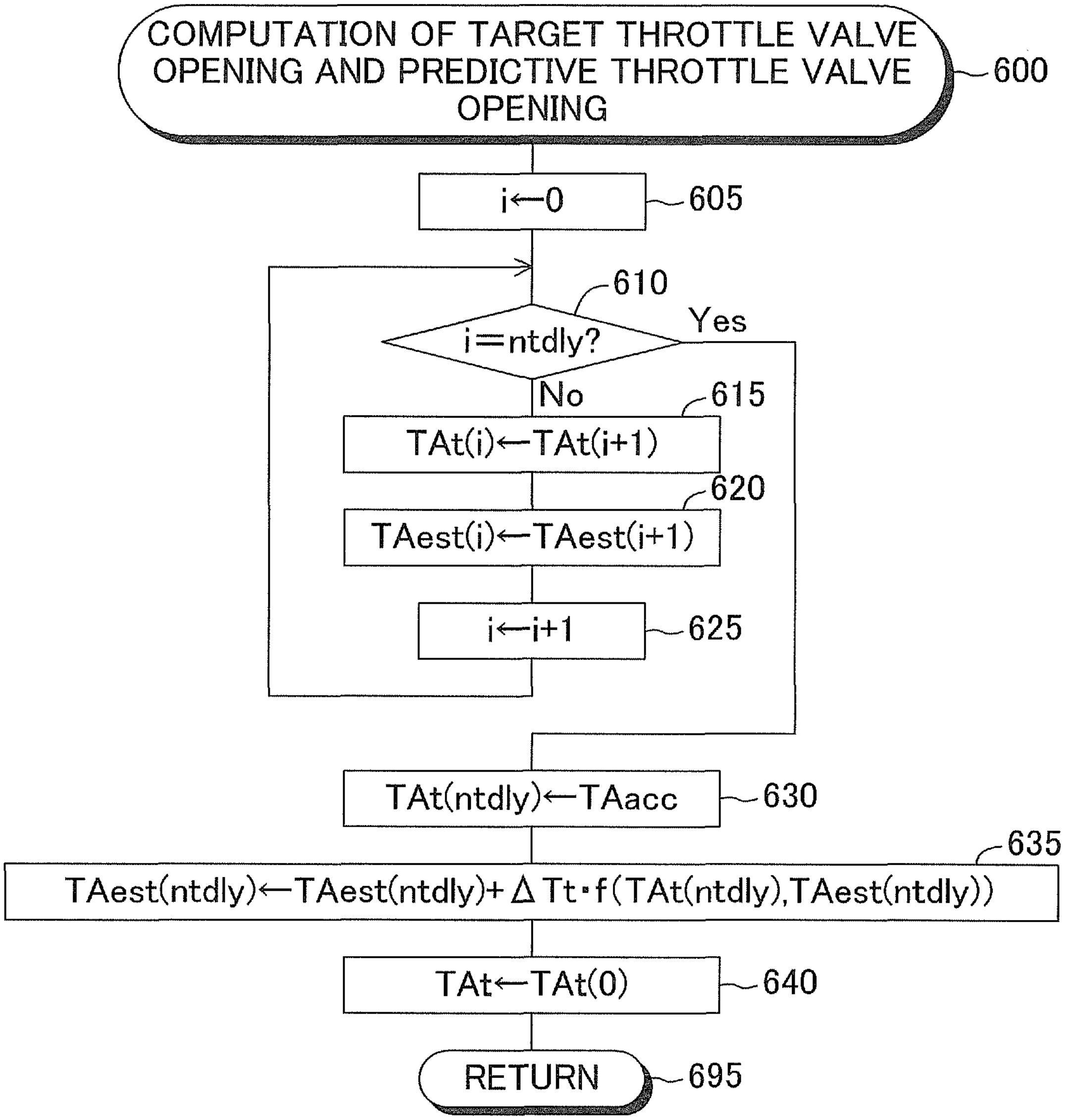
FIG. 6 is a flowchart showing a program which is executed by the CPU shown in FIG. 1 so as to compute the target throttle valve opening and the predictive throttle valve opening.

The CPU 71 executes the routine shown in the flowchart of FIG. 6 each time the computation period ΔTt (8 msec in the present embodiment) elapses so as to perform the functions of the above-described electronically-controlled throttle valve logic A1 and the electrically-controlled throttle valve model M1. Specifically, the CPU 71 starts processing from Step 600 at a predetermined timing, proceeds to Step 605 so as to set the value of a variable i to "0", and then proceeds to Step 610 so as to determine whether or not the value of the variable i is equal to a delay count ntdly. The delay count ntdly is a value obtained by dividing the delay time TD by the computation period ΔTt.

Since the value of the variable i is "0" at this point of time, the CPU 71 makes a "No" determination in Step 610, proceeds to Step 615 so as to store the value of provisional target throttle valve opening TAt(i+1) in a memory area for provisional target throttle valve opening TAt(i), and then proceeds to Step 620 so as to store the value of predictive throttle valve opening TAest(i+1) in a memory area for predictive throttle valve opening TAest(i). By means of executing the above-described steps, the value of provisional target throttle valve opening TAt(1) is stored in a memory area for provisional target throttle valve opening TAt(0), and the value of predictive throttle valve opening TAest(1) is stored in a memory area for predictive throttle valve opening TAest(0).

Next, in Step 625, the CPU 71 increases the value of the variable i by "1," and then returns to Step 610. If the value of the variable i is less than the current delay count ntdly, the CPU 71 executes Steps 615 to 625 gain. That is, the CPU 71 repeatedly executes Steps 615 to 625 until the value of the variable i becomes equal to the delay count ntdly. Thus, the values of provisional target throttle valve opening TAt(i+1) are successively shifted to the memory areas for the provisional target throttle valve opening TAt(i), and the values of predictive throttle valve opening TAest(i+1) are successively shifted to the memory areas for the predictive throttle valve opening TAest(i).

When the value of the variable i becomes equal to the delay count ntdly through repetitive execution of the above-described Step 625, the CPU 71 makes a "Yes" determination in Step 610, and then proceeds to Step 630. In Step 630, the CPU 71 obtains the current provisional target throttle valve opening TAacc on the basis of the actual accelerator operation amount Accp at the present point in time and the table shown in FIG. 3, and stores the provisional target throttle valve opening TAacc in a memory area for the provisional target throttle valve opening TAt(ntdly).

Next, the CPU 71 proceeds to Step 635, and computes the current predictive throttle valve opening TAest(ntdly) on the basis of the previous predictive (estimative) throttle valve opening TAest(ntdly), the current provisional target throttle valve opening TAacc, and the expression (shown in the box of Step 635) based on Expression (7) (the right-hand side thereof) given above. Subsequently, in Step 640, the CPU 71 stores the value of the provisional target throttle valve opening TAt(0) in a memory area for the target throttle valve opening TAt, stores the latest predictive throttle valve opening TAest(ntdly) in a memory area for the predictive throttle valve opening TAest. Thereafter, the CPU 71 proceeds to Step 695, to thereby end the current execution of the present routine.

As mentioned above, in the memory related to the target throttle valve opening TAt, the data stored in the memory areas are shifted one by one each time the present routine is executed, and the value stored in the memory area for the provisional target throttle valve opening TAt(0) is read as the target throttle valve opening TAt, which is output to the throttle valve actuator 43a by the electronically-controlled throttle valve logic A1. That is, the value stored in the memory area for the provisional target throttle valve opening TAt (ntdly) through current execution of the present routine is stored in the memory area for provisional target throttle valve opening TAt(0) when the present routine is executed the number of times corresponding to the delay count ntdly, and is used as the target throttle valve opening TAt. Meanwhile, in the memory related to the predictive throttle valve opening TAest, the predictive throttle valve opening TAest after lapse of a predetermined time (m*ΔTt) from the present point in time is stored in a memory area for TAest(m). In this case, the value m is an integer between 1 and ntdly.

(Computation of Predictive Intake Air Quantity KLfwd)

Figure 7:
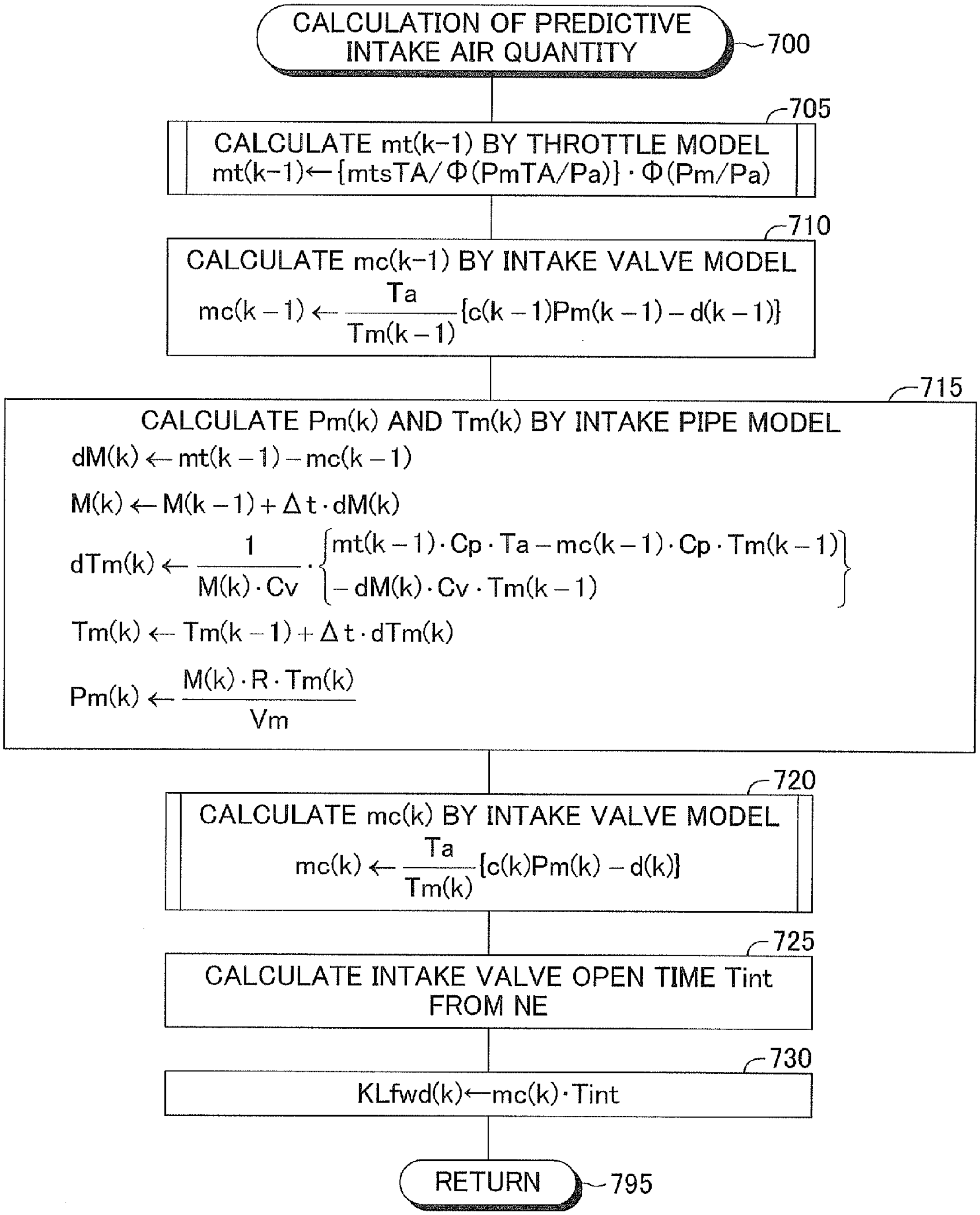
FIG. 7 is a flowchart showing a program which is executed by the CPU shown in FIG. 1 so as to calculate the predictive intake air quantity.
Figure 8:
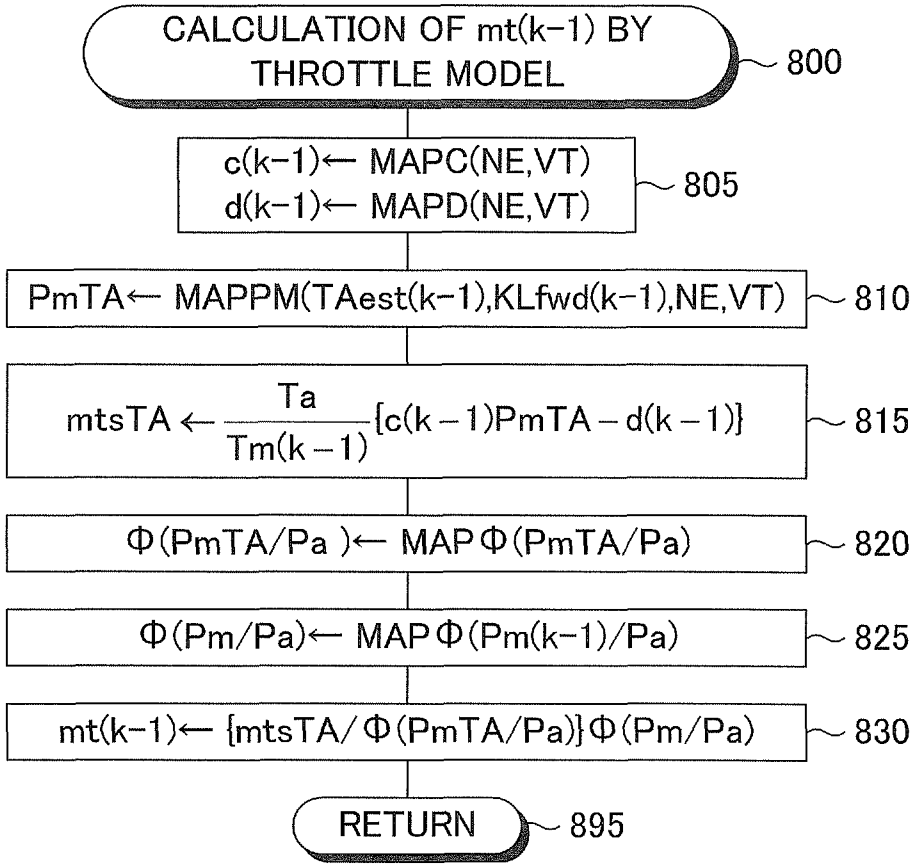
FIG. 8 is a flowchart showing a program which is executed by the CPU shown in FIG. 1 so as to calculate the (predictive) flow rate of air passing through a throttle valve.
Figure 9:
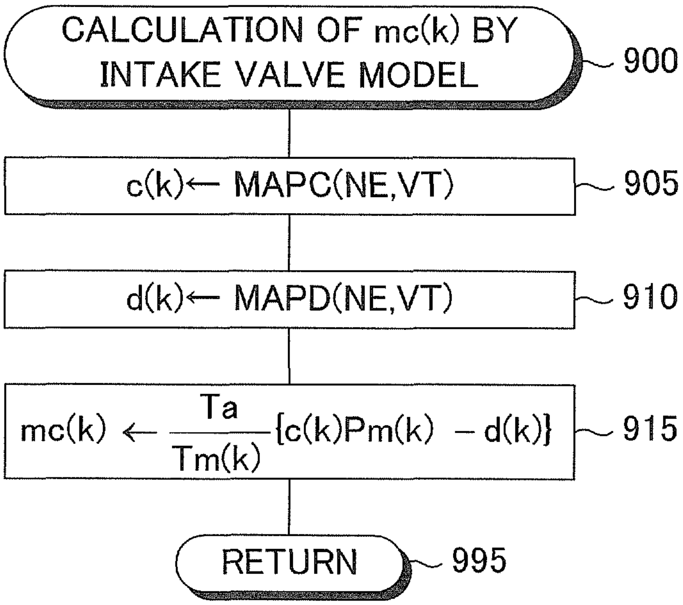
FIG. 9 is a flowchart showing a program which is executed by the CPU shown in FIG. 1 so as to calculate the (predictive) flow rate of air passing through an intake valve.

The CPU 71 executes the predictive intake air quantity computation routine shown in FIG. 7 each time the predetermined computation period ΔTt (8 msec) elapses so as to perform the function of the intake air model A2 (the functions of the throttle model M2, the intake valve model M3, the intake pipe model M4, and the intake valve model M5). Specifically, when a predetermined timing is reached, the CPU 71 starts processing from Step 700, proceeds to Step 705, and then proceeds to Step 800 shown in the flowchart of FIG. 8 so as to obtain the throttle valve passing air flow rate mt(k−1) through use of the throttle model M2 (the expression shown in the box of Step 705, which is based on Expression (12) given above). Notably, the reason why the variable in the parentheses after the throttle valve passing air flow rate mt is not k but k−1 is that the throttle valve passing air flow rate mt(k−1) is obtained through use of the values obtained at a point in time which precedes the present point in time by the computation period ΔTt. Meanings of these variables k and k−1 also apply to other values, which will be described later.

The CPU 71 proceeds from Step 800 to Step 805 so as to obtain the coefficient c (=c(k−1)) contained in Expression (13) given above on the basis of the above-described table MAPC, the engine rotational speed NE at a point in time which precedes the present point in time by the computation period ΔTt, and the intake valve open-close timing VT at a point in time which precedes the present point in time by the computation period ΔTt. In addition, in the same manner, the CPU 71 obtains the value d (=d(k−1)) on the basis of the above-described table MAPD, the engine rotational speed NE at a point in time which precedes the present point in time by the computation period ΔTt, and the intake valve open-close timing VT at a point in time which precedes the present point in time by the computation period ΔTt.

Next, the CPU 71 proceeds to Step 810 so as to obtain the time from the moment immediately before the start of fuel injection (BTDC90° CA) to the intake valve closing timing on the basis of the engine rotational speed NE, and reads, from the RAM 73, the predictive throttle valve opening TAest after lapse of the delay time which is approximately equal to the obtained time. The CPU 71 uses the read predictive throttle valve opening TAest as the predictive throttle valve opening TAest(k−1). The CPU 71 then obtains the intake air pressure PmTA on the basis of the obtained predictive throttle valve opening TAest(k−1), the predictive intake air quantity KLfwd(k−1) obtained in Step 730 of FIG. 7, which will be described later, at the time of previous execution of the present routine, the engine rotational speed NE at a point in time which precedes the present point in time by the computation period ΔTt, the intake valve open-close timing VT at a point in time which precedes the present point in time by the computation period ΔTt, and the above-described table MAPPM.

Next, the CPU 71 proceeds to Step 815 so as to obtain the throttle valve passing air flow rate mtsTA in accordance with the expression shown in the box of Step 815, which is based on Expression (13) given above. Notably, the intake air temperature THA detected by the intake air temperature sensor 62 is used as the throttle valve passing air temperature (i.e., atmospheric temperature) Ta which is used in Step 815. In addition, the value obtained in Step 715 of FIG. 7, which will be described later, at the time of previous execution of the present routine is used as the intake air temperature Tm(k−1).

Next, the CPU 71 proceeds to Step 820 so as to obtain the value of Φ(PmTA/Pa) from the above-described table MAPΦ and the value (PmTA/Pa) which is obtained by dividing the intake air pressure PmTA obtained in the above-described Step 810 by the pre-throttle pressure Pa (atmospheric pressure detected by the atmospheric pressure sensor 63). In the subsequent Step 825, the CPU 71 obtains the value of Φ(Pm(k−1)/Pa) through use of the above-described table MAPΦ, and the value (Pm(k−1)/Pa) obtained by dividing the intake air pressure Pm(k−1), which has been obtained in Step 715 of FIG. 7 (which will be described later) at the time of previous execution of the present routine, by the pre-throttle pressure Pa. In the subsequent Step 830, the CPU 71 obtains the throttle valve passing air flow rate mt(k−1) on the basis of the values obtained in Steps 815, 820, and 825 and the expression shown in the box of Step 830, which represents the throttle model M2. Thereafter, the CPU 71 proceeds to Step 710 of FIG. 7 via Step 895.

In Step 710, the CPU 71 obtains the intake valve passing air flow rate mc(k−1) through use of Expression (13) given above, which represents the above-described intake valve model M3. At this time, the values obtained in Step 805 are used as the coefficient c and the value d. Meanwhile, the corresponding values obtained in Step 715, which will be described later, at the time of previous execution of the present routine are used as the intake air pressure Pm(k−1) and the intake air temperature Tm(k−1), respectively, and the intake air temperature THA detected by the intake air temperature sensor 62 is used as the throttle valve passing air temperature Ta.

Next, the CPU 71 proceeds to Step 715 so as to obtain the current intake air pressure Pm(k) and the current intake air temperature Tm(k) through use of the expressions shown in the box of Step 715, which are obtained by time-discretizing the Expressions (14), (15), and (16) representing the above-described intake pipe model M4 on the basis of the computation period Δt. Δt is a discrete interval used by the intake pipe model M4. If the computation period is ΔTt (=8 msec), the time from the previous(k−1) fuel injection start timing to the previous(k−1) intake valve closing timing is $t_0$, and the time from the current(k) fuel injection start timing to the current(k) intake valve closing timing is $t_1$, then $\Delta t=\Delta Tt+(t_1-t_0)$. dM(k) is the current time-course change in the mass M of air in the post-throttle intake passage during the computation period Δt, and dTm(k) is the current time-course change in the intake air temperature Tm during the computation period Δt.

As the throttle valve passing air flow rate mt(k−1) and the intake valve passing air flow rate mc(k−1), the values obtained in Steps 705 and 710 during the current execution of the present routine are used respectively. As the air mass M(k−1), the value of M(k) which was obtained in Step 715 during the previous execution of the present routine is used. As the time-course change dM(k) in the mass of air, the value obtained in Step 715 during the current execution of the present routine is used. As the air mass M(k), the value obtained in step 715 during the current execution of the present routine is used. As the intake air temperature Tm(k−1), the value of Tm(k) which was obtained in Step 715 during the previous execution of the present routine is used. As the time-course change dTm(k) in the intake air temperature, the value obtained in Step 715 during the current execution of the present routine is used. As he throttle valve passing air temperature Ta, the intake air temperature THA detected by the intake air temperature sensor 62 is used.

Specifically, the current time-course change dM(k) in the air mass M is computed from mt(k−1) and mc(k−1), and Δt·dM(k) is added to the previous air mass M(k−1) so as to compute the current air mass M(k). That is, dM(k) is iteratively added (integrated) so as to compute M(k) iteratively. In the same manner, the current time-course change dTm(k) in the intake air temperature Tm is computed from mt(k−1), mc(k−1), Tm(k−1), dM(k), M(k), and Ta, and Δt·dTm(k) is added to the previous intake air temperature Tm(k−1) so as to compute the current intake air temperature Tm(k). That is, dTm(k) is iteratively added (integrated) so as to compute Tm(k) iteratively. In addition, the current intake air pressure Pm(k) is computed from the integrated values M(k) and Tm(k).

Next, the CPU 71 proceeds to Step 720 so as to obtain the current intake valve passing air flow rate mc(k) on the basis of the expression shown in the box of Step 720, which corresponds to Expression (13) given above and represents the intake valve model M5. Specifically, upon proceeding to Step 720, the CPU 71 proceeds to Step 900 of FIG. 9, and then proceeds to the subsequent Step 905 so as to obtain the coefficient c(k) on the basis of the engine rotational speed NE, the intake valve open-close timing VT, and the table MAPC (c(k)=MAPC(NE, VT)). In the subsequent Step 910, the CPU 71 computes the value d(k) on the basis of the engine rotational speed NE, the intake valve open-close timing VT, and the table MAPD (d(k)=MAPD(NE, VT)). At this time, as the engine rotational speed NE and the intake valve open-close timing VT, the corresponding values at the present point in time are used.

Subsequently, the CPU 71 proceeds Step 915 so as to compute the current intake valve passing air flow rate mc(k) on the basis of the current intake air pressure Pm(k) and the current intake air temperature Tm(k) which are obtained in the above-described Step 715 of FIG. 7; the coefficient c(k) obtained in step 905; and the value d(k) obtained in Step 910. Thereafter, the CPU 71 proceeds to Step 725 of FIG. 7 via Step 995.

Upon proceeding to Step 725, the CPU 71 computes the intake valve open period (the time that elapses from the moment the intake valve opens to the moment the intake valve closes) Tint from the engine rotational speed NE at the present point in time and the intake valve open angle determined by the cam profile of the intake cam shaft. In the subsequent Step 730, the CPU 71 computes the predictive intake air quantity KLfwd(k) by multiplying the above-described current intake valve passing air flow rate mc(k) by the intake valve open period Tint. Thereafter, the CPU 71 proceeds to Step 795, to thereby end the current execution of the present routine. Thus, the predictive intake air quantity KLfwd(k) is obtained.

(Injection Execution Routine)

Figure 10:
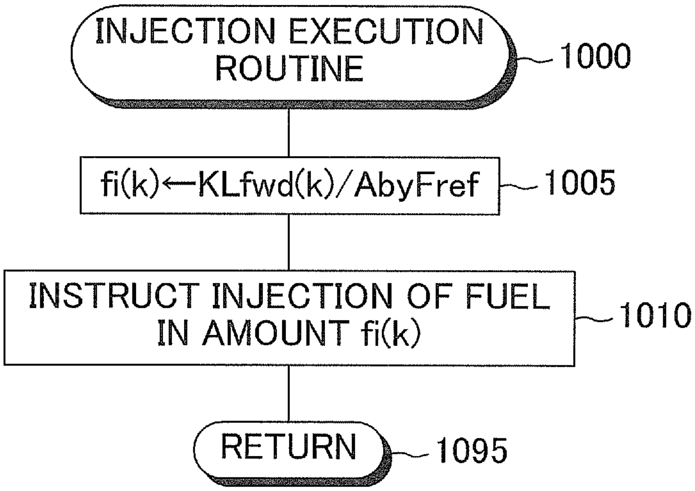
FIG. 10 is a flowchart showing a program which is executed by the CPU shown in FIG. 1 so as to perform fuel injection (calculation of fuel injection quantity).

Next, a routine which is executed by the electric control apparatus 70 so as to actually perform fuel injection will be described with reference to FIG. 10, which shows the routine in the form of a flowchart. The CPU 71 is designed to execute the routine shown in FIG. 10 for each cylinder each time the crank angle thereof becomes BTDC90° CA.

Accordingly, when the crank angle of a specific (any) cylinder (a cylinder entering the intake stroke) becomes BTDC90° CA, the CPU 71 starts processing from Step 1000. In the subsequent Step 1005, the CPU 71 obtains the fuel injection quantity fi(k) of the specific cylinder by dividing, by the target air-fuel ratio AbyFref, the latest predictive intake air quantity KLfwd(k)(i.e., the predictive intake air quantity at the intake valve closing timing (at a point in time in the vicinity of the intake valve closing timing) in the current intake stroke of the specific cylinder) obtained in Step 730 of FIG. 7.

Next, the CPU 71 proceeds to Step 1010 so as to instruct the injector 39 of the above-described specific cylinder to inject fuel in a quantity corresponding to the above-described fuel injection quantity fi(k). Thus, the injector 39 of the above-described specific cylinder injects fuel in the quantity corresponding to the fuel injection quantity fi(k). Next, in Step 1095, the CPU 71 ends the current execution of the present routine.

As mentioned above, according to the above-described embodiment of the fuel injection quantity control apparatus including the gas state estimation device of the present invention for estimating the gas state in the gas passage, the time-course change dM/dt in the mass M of air in the post-throttle intake passage is estimated by applying the mass conservation law to the air in the post-throttle intake passage (see Expression (14) given above and Step 715). The time-course change dTm/dt in the temperature (intake air temperature) Tm of air in the post-throttle intake passage is estimated by applying the energy conservation law to the air in the post-throttle intake passage (see Expression (15) given above and Step 715). In addition, the pressure (intake air pressure) Pm of air in the post-throttle intake passage is estimated on the basis of the mass M of air in the post-throttle intake passage which is obtained through integration of the time-course change dM/dt with respect to time, the intake air temperature Tm obtained through integration of the time-course change dTm/dt with respect to time, the air state equation (see Expression (16) given above and Step 715) containing the term on the volume (effective volume) Vm of the post-throttle intake passage which is applied to the air in the post-throttle intake passage.

Notably, among the Expressions (14), (15), and (16) given above, only Expression (16) given above contains the term on the volume (effective volume) Vm of the post-throttle intake passage. Accordingly, among the time-course change dM/dt in the mass M of air in the post-throttle intake passage, the time-course change dTm/dt in the intake air temperature Tm, and the intake air pressure Pm, only the intake air pressure Pm can vary depending on the value of the effective volume Vm. That is, it is possible to identify the effective volume Vm while monitoring the change in only the intake air pressure Pm. In addition, since Expression (16) given above does not contain a differential term, the degree of change in the intake air pressure Pm with the change in the value of the effective volume Vm is small as compared with the case where Expression (16) given above contains a differential term. As described above, according to the above-described embodiment, identification of the volume (effective volume) Vm of the post-throttle intake passage becomes comparatively easy.

The present invention is not limited to the above-described embodiment, and various modifications may be employed within the scope of the present invention. For example, in the above-described embodiment, there is given an example in which the post-throttle intake passage (i.e., a portion of the intake passage between the throttle valve 43 and the intake valve 32) is employed as a gas passage whose gas state (the temperature and pressure of gas) is estimated. However, the embodiment may be modified such that a portion of the exhaust passage between the exhaust valve 35 and the catalytic converter 53 is employed as the above-described gas passage. In addition, in the case where an in-line two-stage turbocharged system is provided, a portion of the intake passage between first and second compressors or a portion of the exhaust passage between first and second turbochargers may be employed as the above-described gas passage. Also, the internal space of an intercooler for cooling intake air may be employed as the above-described gas passage.

The invention claimed is:

1. A device for estimating the state of gas in a gas passage provided in an internal combustion engine, comprising:

first estimation means for estimating a time-course change in the mass of gas in the gas passage through application of a mass conservation law to the gas in the gas passage;

second estimation means for estimating a time-course change in the temperature of the gas in the gas passage through application of an energy conservation law to the gas in the gas passage; and third estimation means for estimating the pressure of the gas in the gas passage on the basis of the mass of the gas obtained through iterative integration of the estimated time-course change in the mass of the gas with respect to time, the temperature of the gas obtained through iterative integration of the estimated time-course change in the temperature of the gas with respect to time, and a gas state equation which is applied to the gas in the gas passage and which includes a term regarding the volume of the gas passage.

2. A device for estimating the state of gas in a gas passage according to claim 1, wherein the first estimation means is configured to estimate the time-course change dM/dt in the mass of the gas in the gas passage in accordance with the following relation:

$$dM/dt=mt-mc$$

where mt represents the mass flow rate of gas flowing into the gas passage; mc represents the mass flow rate of gas flowing out of the gas passage; M represents the mass of gas in the gas passage; and t represent time.

3. A device for estimating the state of gas in a gas passage according to claim 1, wherein the second estimation means is configured to estimate the time-course change dTm/dt in the temperature of the gas in the gas passage in accordance with the following relation:

$$dTm/dt=(1/(M\cdot Cv))\cdot(mt\cdot Cp\cdot Ta-mc\cdot Cp\cdot Tm-dM/dt\cdot Cv\cdot Tm)$$

where mt represents the mass flow rate of gas flowing into the gas passage; mc represents the mass flow rate of gas flowing out of the gas passage; M represents the mass of gas in the gas passage; Ta represents the temperature of the gas flowing into the gas passage; Tm represents the temperature of the gas in the gas passage; Cv represents the specific heat at constant volume of the gas in the gas passage; Cp represents the specific heat at constant pressure of the gas in the gas passage; and t represents time.

4. A device for estimating the state of gas in a gas passage according to claim 1, wherein the third estimation means is configured to estimate the pressure Pm of the gas in the gas passage in accordance with the following relation:

$$Pm=(1/Vm)\cdot M\cdot R\cdot Tm$$

where M represents the mass of the gas obtained by iteratively integrating, with respect to time, the time-course change in the mass of the gas in the gas passage estimated by the first estimation means; Tm represents the temperature of the gas obtained by iteratively integrating, with respect to time, the time-course change in the temperature of the gas in the gas passage estimated by the second estimation means; R represents the gas constant of the gas in the gas passage; Vm represents the volume of the gas passage; and Pm represents the pressure of the gas in the gas passage.

5. A device for estimating the state of gas in a gas passage according to claim 1, wherein the gas passage is an intake passage of the internal combustion engine between a throttle valve and an intake valve.

* * * * *